United States Patent
He et al.

(10) Patent No.: US 11,612,960 B2
(45) Date of Patent: Mar. 28, 2023

(54) METHOD FOR PREPARING THIN-WALLED PREFORMS BY LASER METAL DEPOSITION AND FOLLOW-UP ROLLING

(71) Applicant: DALIAN UNIVERSITY OF TECHNOLOGY, Liaoning (CN)

(72) Inventors: Zhubin He, Liaoning (CN); Jiangkai Liang, Liaoning (CN); Wei Du, Liaoning (CN); Xinyu Hu, Liaoning (CN); Yi Xu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/864,176

(22) Filed: Jul. 13, 2022

(65) Prior Publication Data

US 2023/0066289 A1 Mar. 2, 2023

(30) Foreign Application Priority Data

Sep. 1, 2021 (CN) .......................... 202111018387.X

(51) Int. Cl.
*B23K 26/342* (2014.01)
*B23K 26/082* (2014.01)
(Continued)

(52) U.S. Cl.
CPC ............ *B23K 26/342* (2015.10); *B21B 37/24* (2013.01); *B21B 47/00* (2013.01); *B23K 26/082* (2015.10);
(Continued)

(58) Field of Classification Search
CPC .. B23K 26/342; B23K 26/082; B23K 26/702; B21B 37/24; B21B 47/00; B33Y 10/00; B33Y 50/02; B33Y 40/20
(Continued)

(56) References Cited

U.S. PATENT DOCUMENTS

| | | | |
|---|---|---|---|
| 2013/0197683 A1* | 8/2013 | Zhang | B22F 12/86 700/96 |
| 2015/0048553 A1* | 2/2015 | Dietrich | B33Y 40/20 264/401 |
| 2016/0375489 A1 | 12/2016 | Marchione | |

FOREIGN PATENT DOCUMENTS

| | | |
|---|---|---|
| CN | 101817121 A | 9/2010 |
| CN | 108580884 A | 9/2018 |

(Continued)

*Primary Examiner* — Dana Ross
*Assistant Examiner* — Joe E Mills, Jr.
(74) *Attorney, Agent, or Firm* — Muncy, Geissler, Olds & Lowe, P.C.

(57) ABSTRACT

Laser additive manufacturing and a method for preparing thin-walled preforms by laser metal deposition and follow-up rolling. This can solve the problems that when the existing laser metal deposition technology prepares the thin-walled preforms, the limit width size of a molten pool at high power affects the forming wall thickness of the preforms so that it is difficult to prepare preforms with wall thickness less than 2 mm, and the problems of poor surface quality and low accuracy of preforms due to convex and concave peaks caused by the interlayer overlapping, but also can solve the problems that a laser beam with a preset trajectory cannot act on the end surfaces of the preforms due to preform deformation caused by residual stress in a printing process so that the preforms cannot be continuously formed.

3 Claims, 5 Drawing Sheets

(51) Int. Cl.
*B23K 26/70* (2014.01)
*B21B 47/00* (2006.01)
*B21B 37/24* (2006.01)
*B33Y 50/02* (2015.01)
*B33Y 10/00* (2015.01)
*B33Y 40/20* (2020.01)

(52) U.S. Cl.
CPC .............. *B23K 26/702* (2015.10); *B33Y 10/00* (2014.12); *B33Y 40/20* (2020.01); *B33Y 50/02* (2014.12)

(58) Field of Classification Search
USPC ....................................................... 219/76.12
See application file for complete search history.

(56) References Cited

FOREIGN PATENT DOCUMENTS

| | | |
|---|---|---|
| CN | 108655402 A | 10/2018 |
| CN | 109014200 A | 12/2018 |
| CN | 109623180 A | 4/2019 |
| WO | WO-2018196106 A1 | 11/2018 |

* cited by examiner

METHOD FOR PREPARING THIN-WALLED PREFORMS BY LASER METAL DEPOSITION AND FOLLOW-UP ROLLING

TECHNICAL FIELD

The present invention belongs to the technical field of laser additive manufacturing, and particularly relates to a method for preparing thin-walled preforms by laser metal deposition and follow-up rolling.

BACKGROUND

With the progress of modern science and technology, the metal additive manufacturing technology has become one of standing processes in the fields of aerospace, nuclear power and rail traffic, and cases of related applications are increasing. At present, the metal additive manufacturing technology mainly includes electron beam melting technology, selective laser melting technology and laser metal deposition technology. The electron beam melting technology has high requirements for vacuum degree, and has small forming space, so it is difficult to prepare large-sized components. Because the electron beam is coarse, the surface quality of formed parts is poor and the accuracy is low. The selective laser melting technology irradiates a high-energy laser beam on pre-applied metal powder material to directly melt, solidify and shape the material to obtain a metal part, but the powder utilization rate is not high, and the forming space is also limited, making it difficult to prepare large-sized components. The laser metal deposition technology retains a series of advantages of traditional 3D printing that flexible design and manufacturing can be realized, the cost and cycle of product development and manufacturing are reduced and complex structural parts can be formed at one time. The principle is: according to a preset forming trajectory, the laser beam acts on the surface of base material to form a molten pool on the surface of the base material. With the features of using alloy powder as raw material and synchronously feeding powder, a new metal layer metallurgically bonded to base metal and having less dilution ratio is formed through laser melting, rapid solidification and layer by layer deposition and manufacturing. The process is repeated until the part is manufactured and repaired. Compared with other 3D printing technologies for metal parts, the size of the parts formed by the laser metal deposition technology is larger, the forming speed is higher, and the powder utilization rate is higher. Therefore, the laser metal deposition technology has wide application prospects in the manufacture of large-sized thin-walled metal components such as inlets of hypersonic vehicles, hollow blades of aero-engines and steam turbine blades. At present, the thin-walled metal components can be classified into simple shaped thin-walled metal components and complex shaped thin-walled metal components according to the complexity of the structures. The two types of components are usually prepared by different forming technologies. The laser metal deposition technology is often used for directly forming simple shaped thin-walled metal components with small section difference and small curvature change. However, for complex shaped thin-walled metal components with large section difference, bending axes and complex curvatures, firstly, a thin-walled tabular/tubiform preform with a shape similar to a final component is prepared by the laser metal deposition technology; then, the thin-walled preform is placed in a forming die and subjected to hot gas bulging forming under high temperature and high pressure conditions to obtain a complex thin-walled metal component that finally conforms to the requirements of shape and dimensional accuracy. Therefore, when the complex shaped thin-walled metal components are prepared, the preparation of the thin-walled preforms is particularly important.

However, when the thin-walled preforms are prepared through the laser metal deposition, the following problems exist: firstly, because the minimum spot diameter of the laser beam used by the existing laser metal deposition coaxial powder feeding 3D printing equipment is greater than 1 mm, which is much larger than the minimum spot diameter of the laser beam used by selective laser melting equipment, and the thickness of a powder layer is 0.3-1 mm, high laser power is required to melt the metal powder when the preforms are formed. However, the limit width of the molten pool at high power will affect the forming wall thickness of the preforms, and it is difficult to prepare the thin-walled preforms with wall thickness less than 2 mm. Secondly, due to large height of a single deposition layer of laser metal deposition, the surface of a formed preform has convex and concave peaks generated by interlayer overlapping, resulting in poor surface quality of the preform. Therefore, the existing laser metal deposition technology cannot directly print large-sized thin-walled slabs/billets with uniform wall thickness, good surface quality, uniform and stable performance and high flatness. However, for the thin-walled preforms with convex and concave peaks on the surface, due to poor surface flatness during subsequent hot gas bulging forming, there is large frictional resistance between the preform and the forming die in a deformation process, which is not conducive to plastic deformation. In addition, the convex and concave peaks generated by interlayer overlapping may have local residual stress in the deformation process, thereby easily leading to cracks.

In order to solve the above problems, the existing technology for preparing thin-walled preforms often adopts an additive-subtractive composite processing technology, which integrates an additive manufacturing module and a subtractive manufacturing module, introduces the subtractive manufacturing technology after additive manufacturing of a certain number of layers, and conducts high-accuracy subtractive processing on the deposited preforms, thereby making up for the problems of poor surface quality and low dimensional accuracy of the preforms after pure additive manufacturing. However, due to obvious thermal bulging characteristics of metal material in the process of additive manufacturing, under the condition of high thermal gradient, different degrees of thermal bulging and consequent thermal stress will be generated at different positions. The thermal stress will cause deformation of the preforms during forming. On the one hand, the deformation of the preforms in the printing process may lead to that a laser beam with a preset trajectory cannot act on the end surfaces of the printed preforms so that the thin-walled preforms cannot be continuously formed. On the other hand, the deformation of the preforms in the printing process will lead to that a cutter cannot act on the corresponding correct position of the processed preforms in the process of subtractive manufacturing. Therefore, for the additive-subtractive composite processing technology, the deformation caused by residual stress in the additive manufacturing process will affect the connection between the laser beam and the end surfaces of the preforms during preform preparation and the shape and dimensional accuracy of the preforms in the subtractive manufacturing process.

A new method for preparing thin-walled preforms needs to be developed in order to solve the problems that when the existing laser metal deposition technology prepares the thin-walled preforms, the limit width size of the molten pool at high power affects the forming wall thickness of the preforms, the convex and concave peaks caused by interlayer overlapping lead to poor surface quality of the preforms, and the preforms in the printing process leads to that a laser beam with a preset trajectory cannot act on the end surfaces of the preforms due to deformation caused by residual stress so that the preforms cannot be continuously formed.

SUMMARY

The purpose of the present invention is to provide a method for preparing thin-walled preforms by laser metal deposition and follow-up rolling, which can solve the problems that when the existing laser metal deposition technology prepares thin-walled preforms, the limit width size of a molten pool at high power affects the forming wall thickness of the preforms, the convex and concave peaks caused by interlayer overlapping lead to poor surface quality of the preforms, and the preforms in the printing process leads to that a laser beam with a preset trajectory cannot act on the end surfaces of the preforms due to deformation caused by residual stress so that the preforms cannot be continuously formed.

The technical solution of the present invention is as follows:

A method for preparing thin-walled preforms by laser metal deposition and follow-up rolling comprises the following steps:

step 1. designing thin-walled preforms: analyzing the characteristics of complex thin-walled components, and determining the material and outline sizes of the thin-wall preforms required for hot gas bulging forming of the complex thin-walled components by theoretical calculation or FEM reverse simulation method; the thin-walled preforms comprising thin-walled slabs and thin-walled billets which can also be divided into equal wall thickness thin-walled slabs/billets and variable wall thickness thin-walled slabs/billets according to thickness uniformity;

step 2. determining process parameters of laser metal deposition: selecting layer thickness according to the structures and shapes of the thin-walled preforms determined in step 1; selecting the layer thickness of the preforms as 0.4-0.6 mm for the equal wall thickness thin-walled slabs/billets; selecting the layer thickness of the preforms as 0.2-0.4 mm for the variable wall thickness thin-walled slabs/billets; a single layer lift of a laser head being equal to the layer thickness of the preforms; determining a laser scanning path according to a layering result obtained after an STL model of the thin-walled preforms is processed by layering slice software; and determining other process parameters of laser metal deposition, comprising laser power, spot diameter, scanning speed, powder feeding rate, gas composition, pressure and flow rate, according to the forming wall thickness and forming requirements of the thin-walled preforms;

the preparation of the thin-walled preforms with active properties and easy oxidation reaction is conducted in an argon atmosphere with oxygen content lower than 0.05%;

an atmosphere required for the preparation of the thin-walled preforms with good oxidation resistance is adjusted according to the used material;

step 3. determining roller follow-up rolling solutions and process parameters: selecting different follow-up rolling solutions according to the outline sizes of the thin-walled preforms determined in step 1; for preparation of the thin-walled slabs, adopting a solution that a roller conducts integral follow-up rolling on a layer after the layer is printed by laser, or adopting a solution that the roller conducts local follow-up rolling while laser printing; for preparation of the thin-walled billets, adopting the solution that the roller conducts local follow-up rolling while laser printing because the billets have closed sections;

for integral follow-up rolling: a roller spacing is equal to the forming wall thickness of the preforms, a roller length is equal to the total length of a single-track single deposition layer, and a roller diameter is equal to the layer thickness of the preforms, wherein a specific calculation process of roller speed is:

$$h = n \cdot t_1 \cdot \pi \cdot d \quad (1)$$

where h represents the layer thickness of the preforms, n represents the roller speed, $t_1$ represents the scanning time of a single-track single layer of the laser head, and d represents the roller diameter;

$$t_1 = L/V \quad (2)$$

where L represents the total length of the single-track single deposition layer, and V represents laser scanning speed;

an expression of the roller speed in the integral follow-up rolling solution is:

$$n = \frac{h \cdot V}{\pi \cdot d \cdot L} \quad (3)$$

for local follow-up rolling: a roller spacing is equal to the forming wall thickness of the preforms, an axial roller length is greater than or equal to 3 times the layer thickness of the preforms, and a roller diameter is equal to the layer thickness of the preforms, wherein a specific calculation process of roller speed is:

$$n \cdot t_2 \cdot \pi \cdot d = V \cdot t_2 \quad (4)$$

where n represents the roller speed, $t_2$ represents the movement time of the laser head, d represents the roller diameter and V represents laser scanning speed;

an expression of the roller speed in the local follow-up rolling solution is:

$$n = \frac{V}{\pi \cdot d} \quad (5)$$

in the local follow-up rolling solution, the roller conducts follow-up rolling again on a previous deposition layer while conducting follow-up rolling on the deposited area of a current layer;

step 4. conducting laser printing on an $n^{th}$ layer and completing follow-up rolling: printing an $n^{th}$ deposition layer according to the laser metal deposition process parameters determined in step 2 and the roller follow-up rolling solution and process parameters determined in step 3; making the roller and the laser head move synchronously in a printing process; and conducting follow-up rolling on a deposited area after the laser printing; wherein n is a natural number;

step 5. repeating step 2 to step 4: calculating the total number of laser printing layers according to the total forming height of the thin-walled preforms and the layer thickness determined in step 2; wherein the total number of printing layers is equal to the total forming height of the thin-walled preforms divided by the layer thickness; repeating step 2 to step 4, predicting the deposition of a next layer after printing one layer, and then conducting deposition forming layer by layer, until the thin-walled preforms are printed;

step 6. post-processing the thin-walled preforms: after completing the preparation of the thin-walled preforms by laser metal deposition, conducting hot isostatic pressing on the formed thin-walled preforms under high temperature and high pressure conditions to eliminate micro-cracks, gas holes, unfused defects and the like in the thin-walled preforms after laser metal deposition manufacture; and necessarily polishing and cleaning the ends and surfaces of the preforms to obtain the thin-walled preforms which can be finally used for forming the complex thin-wall components by hot gas bulging.

The present invention has the following beneficial effects:

(1) The method for preparing thin-walled preforms by laser metal deposition and follow-up rolling in the present invention uses the roller to conduct follow-up rolling on the deposited area completed by laser metal deposition, which can solve the problems that when the existing laser metal deposition technology prepares thin-walled preforms, the limit width size of a molten pool at high power affects the forming wall thickness of the preforms and thus it is difficult to prepare thin-walled preforms with wall thickness less than 2 mm, and the convex and concave peaks caused by the interlayer overlapping lead to poor surface quality and low accuracy of the preforms.

(2) The method for preparing thin-walled preforms by laser metal deposition and follow-up rolling in the present invention uses the roller to conduct follow-up rolling on the deposited area completed by laser metal deposition to conduct necessary rectification on the deposited area, to avoid the problem that a laser beam with a preset trajectory cannot act on the end surfaces of the preforms due to deformation caused by residual stress so that the preforms cannot be continuously formed.

(3) The method for preparing thin-walled preforms by laser metal deposition and follow-up rolling in the present invention can adjust the spacing of the rolls according to the forming wall thickness requirements of different characteristic areas of the thin-walled preforms to prepare equal wall thickness and variable wall thickness thin-walled preforms. At the same time, the method can overcome the problem of molten pool flow caused by interlayer accumulation, and improve the forming quality of the surfaces of the preforms.

(4) In the method for preparing thin-walled preforms by laser metal deposition and follow-up rolling in the present invention, since the deposited area undergoes an uneven rapid cooling effect during the laser metal deposition process, the deposited area suffers from tensile stress. The roller is used to conduct follow-up rolling on the deposited area after laser metal deposition to offset the thermal stress generated during some laser metal deposition processes and simultaneously improve the density and microstructure performance uniformity of the thin-walled preforms.

DESCRIPTION OF DRAWINGS

FIG. 2(a) is an equal wall thickness thin-walled slab; FIG. 2(b) is a variable wall thickness thin-walled slab; FIG. 2(c) is an equal wall thickness thin-walled billet; FIG. 2(d) is a variable wall thickness thin-walled billet.

Figure 1:
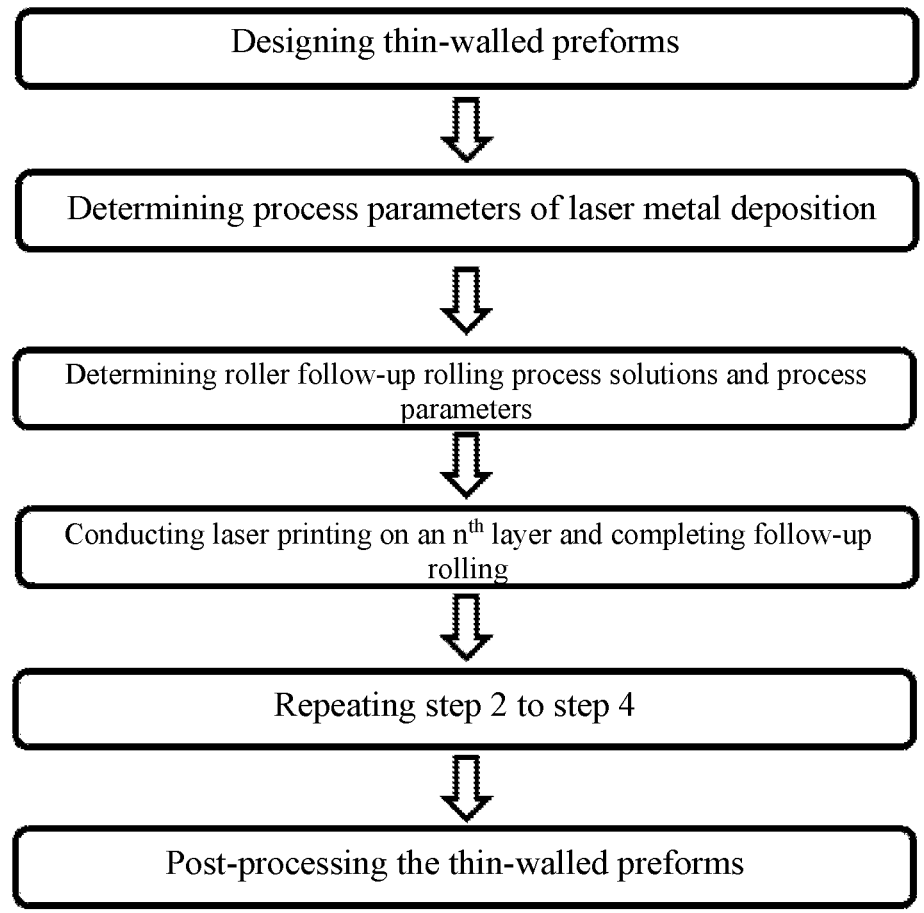
FIG. 1 is a schematic diagram of a method for preparing thin-walled preforms by laser metal deposition and follow-up rolling in the present invention.
Figure 2A:
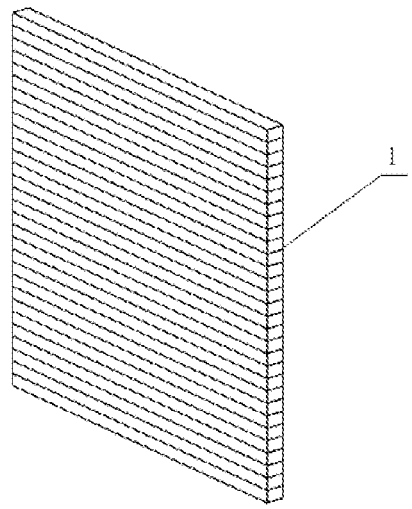
FIGS. 2(a)-2(d) show schematic diagrams of thin-walled preforms to be prepared by the present invention.
Figure 2B:
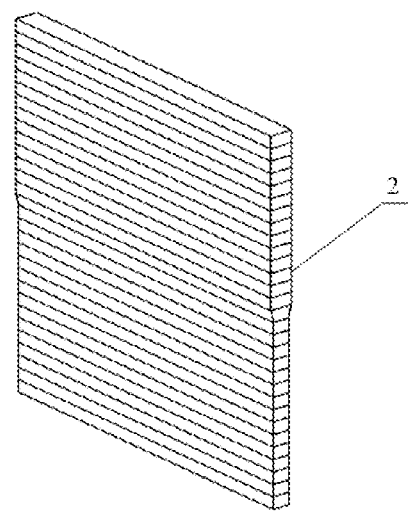
Figure 2C:
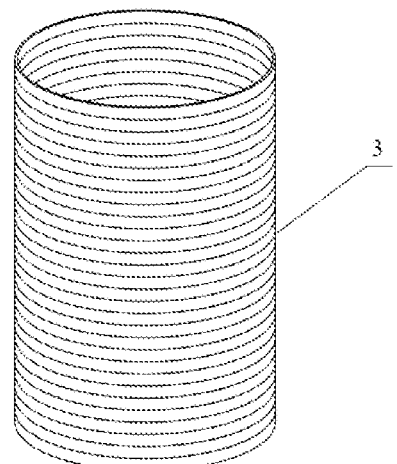
Figure 2D:
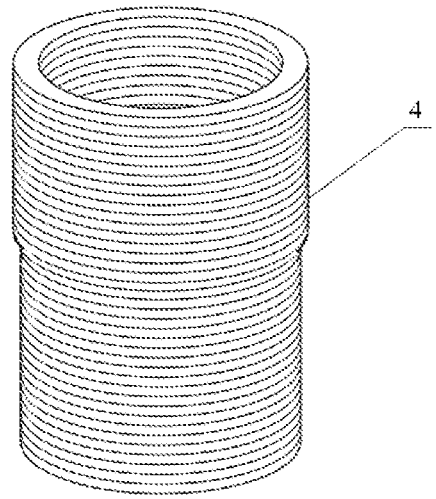

In the drawings: 1 equal wall thickness thin-walled slab; 2 variable wall thickness thin-walled slab; 3 equal wall thickness thin-walled billet; 4 variable wall thickness thin-walled billet; 5 laser head; 6 powder feeder; 7 powder nozzle; 8 substrate; 9 rotating spindle; 10 workbench; 11 slide rail; 12 roller steering; 13 roller.

DETAILED DESCRIPTION

Specific embodiments of the present invention are further described below in combination with the drawings and the technical solutions.

Embodiment 1: in combination with the illustration of FIG. 1, FIGS. 2(a)-2(d), FIG. 3, FIG. 4, FIG. 5, FIG. 6 and FIG. 7, the present invention proposes a method for preparing thin-walled preforms by laser metal deposition and follow-up rolling. The method is conducted according to the following steps:

Step 1. designing thin-walled preforms: analyzing the characteristics of complex thin-walled components, and determining the material and outline sizes of the thin-wall preforms required for hot gas bulging forming of the complex thin-walled components by theoretical calculation or FEM reverse simulation method.

Step 2. determining process parameters of laser metal deposition: selecting layer thickness according to the structures and shapes of the thin-walled preforms determined in step 1; selecting the layer thickness of the preforms as 0.4-0.6 mm for the equal wall thickness thin-walled slabs/billets; selecting the layer thickness of the preforms as 0.2-0.4 mm for the variable wall thickness thin-walled slabs/billets; a single layer lift of a laser head being equal to the layer thickness of the preforms; determining a laser scanning path according to a layering result obtained after an STL model of the thin-walled preforms is processed by layering slice software; and determining other process parameters of laser metal deposition, comprising laser power, spot diameter, scanning speed, powder feeding rate, gas composition, pressure and flow rate, according to the forming wall thickness and forming requirements of the thin-walled preforms; and conducting the preparation of the thin-walled preforms in an argon atmosphere with oxygen content lower than 0.05%.

Step 3. determining roller follow-up rolling solutions and process parameters: selecting different follow-up rolling solutions according to the outline sizes of the thin-walled preforms determined in step 1; for preparation of the thin-walled slabs, adopting a solution that a roller conducts integral follow-up rolling on a layer after the layer is printed by laser, or adopting a solution that the roller conducts local follow-up rolling while laser printing; for preparation of the thin-walled billets, adopting the solution that the roller conducts local follow-up rolling while laser printing because the billets have closed sections;

for integral follow-up rolling: a roller spacing is equal to the forming wall thickness of the preforms, a roller length is equal to the total length of a single-track single deposition layer, and a roller diameter is equal to the layer thickness of the preforms, wherein a specific calculation process of roller speed is:

$$h = n \cdot t_1 \cdot \pi \cdot d \tag{1}$$

where h represents the layer thickness of the preforms, n represents the roller speed, $t_1$ represents the scanning time of a single-track single layer of the laser head, and d represents the roller diameter;

$$t_1 = L/V \tag{2}$$

where L represents the total length of the single-track single deposition layer, and V represents laser scanning speed;

an expression of the roller speed in the integral follow-up rolling solution is:

$$n = \frac{h \cdot V}{\pi \cdot d \cdot L} \tag{3}$$

for local follow-up rolling: a roller spacing is equal to the forming wall thickness of the preforms, an axial roller length is greater than or equal to 3 times the layer thickness of the preforms, and a roller diameter is equal to the layer thickness of the preforms, wherein a specific calculation process of roller speed is:

$$n \cdot t_2 \cdot \pi \cdot d = V \cdot t_2 \tag{4}$$

where n represents the roller speed, $t_2$ represents the movement time of the laser head, d represents the roller diameter and V represents laser scanning speed;

an expression of the roller speed in the local follow-up rolling solution is:

$$n = \frac{V}{\pi \cdot d} \tag{5}$$

in the local follow-up rolling solution, the roller conducts follow-up rolling again on a previous deposition layer while conducting follow-up rolling on the deposited area of a current layer.

Step 4. conducting laser printing on an $n^{th}$ layer and completing follow-up rolling: printing an $n^{th}$ deposition layer according to the laser metal deposition process parameters determined in step 2 and the roller follow-up rolling solution and process parameters determined in step 3 (n is 1, 2, 3, etc.); making the roller and the laser head move synchronously in a printing process; and conducting follow-up rolling on a deposited area after the laser printing.

Step 5. repeating step 2 to step 4: calculating the total number of laser printing layers according to the total forming height of the thin-walled preforms and the layer thickness determined in step 2; wherein the total number of printing layers is equal to the total forming height of the thin-walled preforms divided by the layer thickness; repeating step 2 to step 4, predicting the deposition of a next layer after printing one layer, and conducting deposition forming layer by layer, until the thin-walled preforms are printed.

Step 6. post-processing the thin-walled preforms: after completing the preparation of the preforms by laser metal deposition, conducting hot isostatic pressing on the formed thin-walled preforms at 910° C. and 120 MPa under thermal insulation to eliminate micro-cracks, gas holes and unfused defects in the thin-walled preforms after laser metal deposition manufacture; and necessarily polishing and cleaning the ends and surfaces of the preforms to obtain the thin-walled preforms which can be finally used for forming the complex thin-wall components by hot gas bulging.

The present embodiment has the following beneficial effects: the method for preparing thin-walled preforms by laser metal deposition and follow-up rolling uses the roller to conduct follow-up rolling on the deposited area completed by laser metal deposition, which can solve the problems that when the existing laser metal deposition prepares thin-walled preforms, the limit width size of a molten pool at high power affects the forming wall thickness of the preforms and thus it is difficult to prepare thin-walled preforms with wall thickness less than 2 mm, and the convex and concave peaks caused by the interlayer overlapping lead to poor surface quality and low accuracy of the preforms. Moreover, the method can achieve the effect of rectification on the deposited area, to avoid the problem that a laser beam with a preset trajectory cannot act on the end surfaces of the preforms due to deformation caused by residual stress in the printing process so that the preforms cannot be continuously formed. In addition, the method can also adjust the spacing of the rolls according to the forming wall thickness requirements of different characteristic areas of the thin-walled preforms to prepare equal wall thickness and variable wall thickness thin-walled preforms and simultaneously improve the density and microstructure performance uniformity of the thin-walled preforms.

Figure 3:
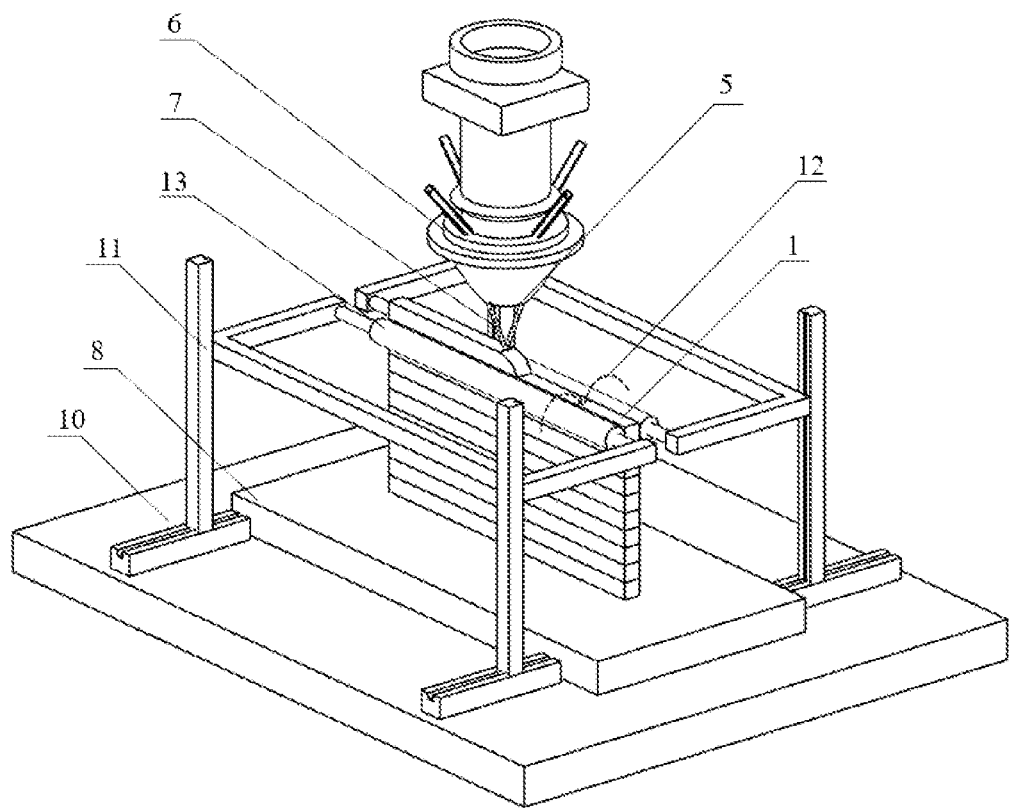
FIG. 3 is a schematic diagram of an equal wall thickness thin-walled slab prepared by laser metal deposition and integral follow-up rolling in the present invention.

Embodiment 2: in combination with the illustration of FIG. 3, in step 2 to step 5, when the equal wall thickness thin-walled slabs are prepared, a technical solution of integral follow-up rolling is adopted. Within the time of printing a next layer by the laser head, the roller completes the integral follow-up rolling on a previous layer, and two motion states are independent of each other. The roller spacing can be adjusted through a slide rail. Other steps are the same as those of embodiment 1.

The present embodiment has the following beneficial effects: the roller spacing can be adjusted through the slide rail; the roller spacing is adjusted according to the forming wall thickness of the preforms; and the equal wall thickness and variable wall thickness thin-walled preforms can be prepared. The roller conducts integral follow-up rolling on the deposition layer after printing to achieve an effect of rectification on the deposition layer, to avoid the problem that a laser beam with a preset trajectory cannot act on the end surfaces of the preforms due to deformation caused by residual stress so that the preforms cannot be continuously formed.

Figure 4:
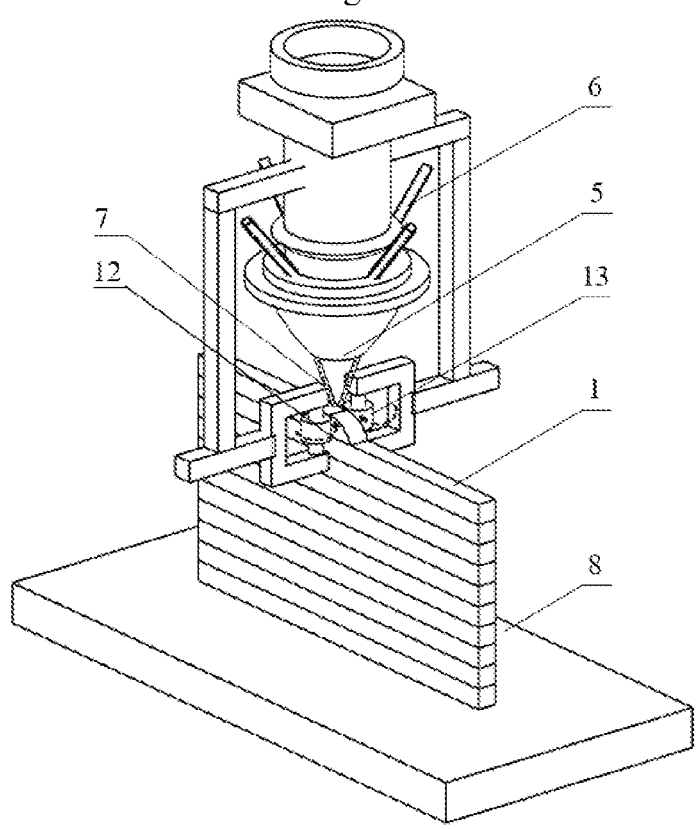
FIG. 4 is a schematic diagram of an equal wall thickness thin-walled slab prepared by laser metal deposition and local follow-up rolling in the present invention.
Figure 5:
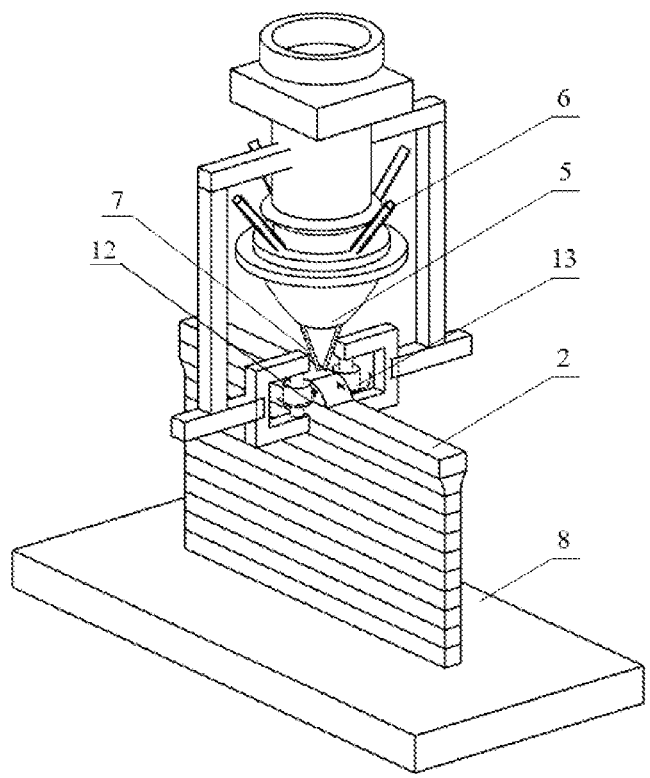
FIG. 5 is a schematic diagram of a variable wall thickness thin-walled slab prepared by laser metal deposition and local follow-up rolling in the present invention.

Embodiment 3: in combination with the illustration of FIG. 4 and FIG. 5, in step 2 to step 5, when the equal wall thickness thin-walled slabs or variable wall thickness thin-walled slabs are prepared by laser metal deposition, a solution that the laser head and the roller move back and forth synchronously is adopted. In the process of moving back and forth, a deflection angle of the roller needs to be adjusted so that the roller keeps a line contact state with the deposited area. Other steps are the same as those of embodiment 1.

The present embodiment has the following beneficial effects: by adopting the solution that the laser head and the roller move back and forth synchronously, the roller can conduct real-time local follow-up rolling on the deposited area after printing, which can solve the problems of poor surface quality and low accuracy of preforms due to convex and concave peaks caused by the interlayer overlapping. Only the rotation speed and angle of the roller need to be controlled in the printing process. In addition, the material density and microstructure performance uniformity of the deposited area can also be improved.

Figure 6:
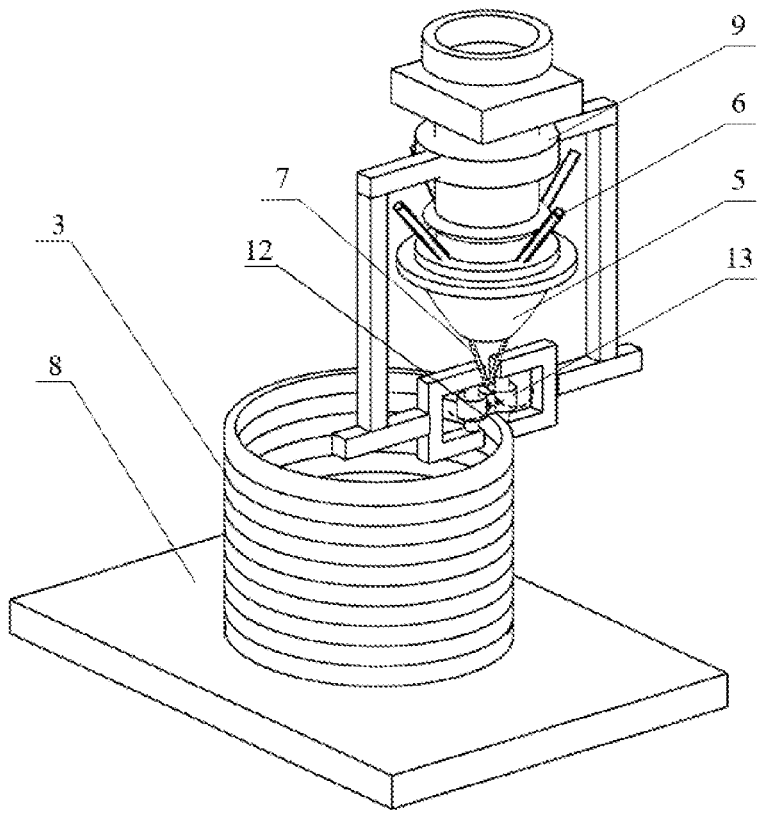
FIG. 6 is a schematic diagram of an equal wall thickness thin-walled billet prepared by laser metal deposition and local follow-up rolling in the present invention.
Figure 7:
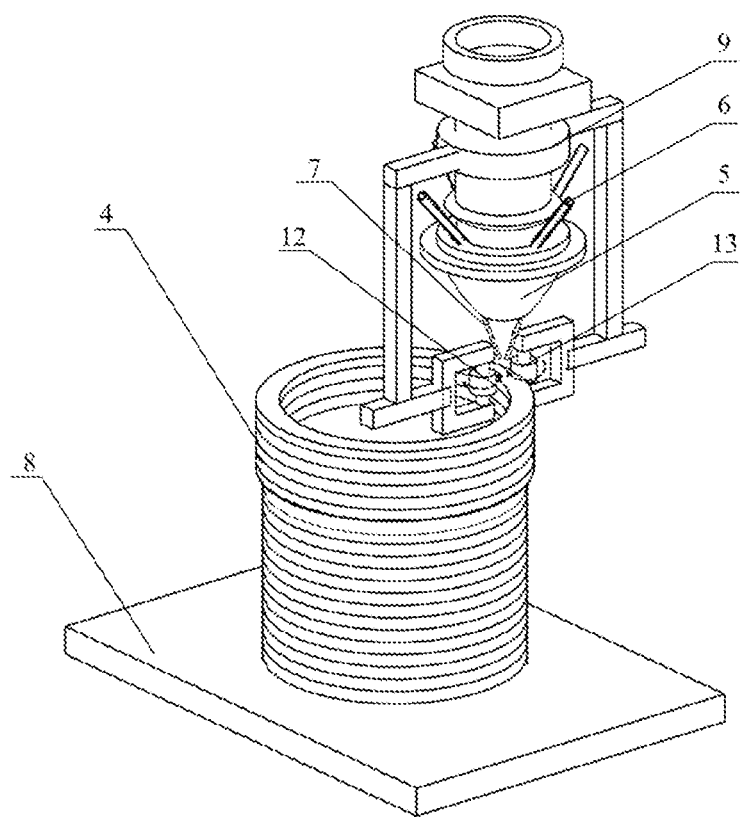
FIG. 7 is a schematic diagram of a variable wall thickness thin-walled billet prepared by laser metal deposition and local follow-up rolling in the present invention.

Embodiment 4: in combination with the illustration of FIG. 6 and FIG. 7, in step 2 to step 5, when the equal wall thickness thin-walled billets or variable wall thickness thin-walled billets are prepared by laser metal deposition, a solution that the laser head and the roller move back and forth synchronously in the same direction is adopted. In the process of moving in the same direction with the laser head, a rotation angle of the roller needs to be adjusted through a guideway rotating shaft so that the roller always keeps a line contact state with the deposited area. Other steps are the same as those of embodiment 1.

The present embodiment has the following beneficial effects: some billets with smaller diameters, especially variable wall thickness thin-walled billets can be realized by adjusting the roller spacing, which can not only improve the forming quality of the inner walls and the outer walls of the billets, but also can solve the problem of outward flow of liquid metal in the molten pool during laser metal deposition. The present embodiment has the advantages of saving expensive powder material and shortening the manufacturing cycle of the thin-walled preforms.

The invention claimed is:

1. A method for preparing thin-walled preforms by laser metal deposition and follow-up rolling, comprising the following steps:

step 1. designing thin-walled preforms: analyzing the characteristics of complex thin-walled components, and determining the material and outline sizes of the thin-wall preforms required for hot gas bulging forming of the complex thin-walled components by theoretical calculation or FEM reverse simulation method; the thin-walled preforms comprising thin-walled slabs and thin-walled billets which can be divided into equal wall thickness thin-walled slabs/billets and variable wall thickness thin-walled slabs/billets according to thickness uniformity;

step 2. determining process parameters of laser metal deposition: selecting layer thickness according to the structures and shapes of the thin-walled preforms determined in step 1; selecting the layer thickness of the preforms as 0.4-0.6 mm for the equal wall thickness thin-walled slabs/billets; selecting the layer thickness of the preforms as 0.2-0.4 mm for the variable wall thickness thin-walled slabs/billets; a single layer lift of a laser head being equal to the layer thickness of the preforms; determining a laser scanning path according to a layering result obtained after an STL model of the thin-walled preforms is processed by layering slice software; and determining other process parameters of laser metal deposition, comprising laser power, spot diameter, scanning speed, powder feeding rate, gas composition, pressure and flow rate, according to the forming wall thickness and forming requirements of the thin-walled preforms;

step 3. determining roller follow-up rolling solutions and process parameters: selecting different follow-up rolling solutions according to the outline sizes of the thin-walled preforms determined in step 1; for preparation of the thin-walled slabs, adopting a solution that a roller conducts integral follow-up rolling on a layer after the layer is printed by laser, or adopting a solution that the roller conducts local follow-up rolling while laser printing; for preparation of the thin-walled billets: adopting the solution that the roller conducts local follow-up rolling while laser printing because the billets have closed sections;

for integral follow-up rolling: a roller spacing is equal to the forming wall thickness of the preforms, a roller length is equal to the total length of a single-track single deposition layer, and a roller diameter is equal to the layer thickness of the preforms, wherein a specific calculation process of roller speed is:

$$h = n \cdot t_1 \cdot \pi \cdot d \qquad (1)$$

where h represents the layer thickness of the preforms, n represents the roller speed, $t_1$ represents the scanning time of a single-track single layer of the laser head, and d represents the roller diameter;

$$t_1 = L/V \qquad (2)$$

where L represents the total length of the single-track single deposition layer, and V represents laser scanning speed;

an expression of the roller speed in the integral follow-up rolling solution is:

$$n = \frac{h \cdot V}{\pi \cdot d \cdot L} \qquad (3)$$

for local follow-up rolling: a roller spacing is equal to the forming wall thickness of the preforms, an axial roller length is greater than or equal to 3 times the layer thickness of the preforms, and a roller diameter is equal to the layer thickness of the preforms, wherein a specific calculation process of roller speed is:

$$n \cdot t_2 \cdot \pi \cdot d = V \cdot t_2 \qquad (4)$$

where n represents the roller speed, $t_2$ represents the movement time of the laser head, d represents the roller diameter and V represents laser scanning speed;

an expression of the roller speed in the local follow-up rolling solution is:

$$n = \frac{V}{\pi \cdot d} \qquad (5)$$

step 4. conducting laser printing on an $n^{th}$ layer and completing follow-up rolling: printing an $n^{th}$ deposition layer according to the laser metal deposition process parameters determined in step 2 and the roller follow-up rolling solution and process parameters determined in step 3; making the roller and the laser head move synchronously in a printing process; and conducting follow-up rolling on a deposited area after the laser printing;

step 5. repeating step 2 to step 4: calculating the total number of laser printing layers according to the total forming height of the thin-walled preforms and the layer thickness determined in step 2; wherein the total number of printing layers is equal to the total forming height of the thin-walled preforms divided by the layer thickness; repeating step 2 to step 4, predicting the deposition of a next layer after printing one layer, and then conducting deposition forming layer by layer, until the thin-walled preforms are printed;

step 6. post-processing the thin-walled preforms: after completing the preparation of the thin-walled preforms by laser metal deposition, conducting hot isostatic pressing on the formed thin-walled preforms under high temperature and high pressure conditions to eliminate micro-cracks, gas holes and unfused defects in the thin-walled preforms after laser metal deposition manufacture; and necessarily polishing and cleaning the ends and surfaces of the preforms to obtain the thin-walled preforms which are finally used for forming the complex thin-wall components by hot gas bulging.

2. The method for preparing thin-walled preforms by laser metal deposition and follow-up rolling according to claim 1, wherein in step 2, the preparation of the thin-walled preforms with active properties and easy oxidation reaction is conducted in an argon atmosphere with oxygen content lower than 0.05%;

an atmosphere required for the preparation of the thin-walled preforms with good oxidation resistance is adjusted according to the used material.

3. The method for preparing thin-walled preforms by laser metal deposition and follow-up rolling according to claim 1, wherein in step 3, in the local follow-up rolling process solution, the roller conducts follow-up rolling again on a previous deposition layer while conducting follow-up rolling on the deposited area of a current layer.

* * * * *